US005728450A

United States Patent [19]

Kouzai et al.

[11] Patent Number: 5,728,450

[45] Date of Patent: Mar. 17, 1998

[54] THERMALLY TRANSFERABLE INK SHEET AND A THERMAL PRINTING APPARATUS USING SAID SHEET

[75] Inventors: Fumio Kouzai; Kenichi Haramoto; Kazuhiko Higashi, all of Hiroshima, Japan

[73] Assignee: Mitsubishi Denki Kabushiki Kaisha, Tokyo, Japan

[21] Appl. No.: 665,761

[22] Filed: Jun. 19, 1996

[30] Foreign Application Priority Data

Jun. 20, 1995 [JP] Japan .................................... 7-153486

[51] Int. Cl.[6] ........................................................ B32B 3/00

[52] U.S. Cl. .......................... 428/195; 428/192; 428/211; 428/212; 428/913

[58] Field of Search ........................... 364/471.01; 226/2, 226/28; 101/248; 428/195, 204, 411.1, 913, 192, 193, 211, 212

[56] References Cited

U.S. PATENT DOCUMENTS 4,496,955 1/1985 Maeyama et al. .

5,185,315 2/1993 Sparer .

5,572,433 11/1996 Falconer et al. .................. 364/471.01

*Primary Examiner*—William Krynski

*Attorney, Agent, or Firm*—Sughrue, Mion, Zinn, Macpeak & Seas, PLLC

[57] ABSTRACT

A Thermally transferable ink sheet comprises a base film having a periodically repeating set of successive ink coated regions having a plurality of color inks thereon, and index mark regions whose index mark comprises a combination of a plurality of sensor marks indicating information regarding the ink sheet located at each border between adjacent ink coated regions. According to a preferred embodiment, each pair of adjacent ink coated regions juxtaposed across each border have extended portions extending toward each other into the index mark region in directions parallel to the direction of ink sheet feeding. Thus, it is possible to read the index mark and identify the ink colors of adjacent ink coated regions at the same time. According to another feature, two sets of index marks are provided contiguous to each other to allow the print apparatus to be controlled by the combination of the resultant readings obtained separately from both sets of index marks.

13 Claims, 9 Drawing Sheets

| SENSOR \ INK COLOR | Y | M | C | BK | SENSOR MARK |
|---|---|---|---|---|---|
| RED LIGHT SENSOR | 0 | 0 | 1 | 1 | 1 |
| INFRARED LIGHT SENSOR | 0 | 0 | 0 | 0 | 1 |

0 : TRANSMISSION
1 : SHADING (a)

| SENSOR \ INK COLOR | FIRST POSITION ($P_1$) | | SECOND POSITION ($P_2$) | | THIRD POSITION ($P_3$) | | FOURTH POSITION ($P_4$) | |
|---|---|---|---|---|---|---|---|---|
| | INK | TRANSMISSION/SHADING | INK | TRANSMISSION/SHADING | INK | TRANSMISSION/SHADING | INK | TRANSMISSION/SHADING |
| $S_1$ | BK | 1 | Y | 0 | M | 0 | C | 1 |
| $S_2$ | Y | 0 | M | 0 | C | 1 | BK | 1 |

0 : TRANSMISSION
1 : SHADING (b)

THERMALLY TRANSFERABLE INK SHEET AND A THERMAL PRINTING APPARATUS USING SAID SHEET

FIELD OF THE INVENTION

The invention relates to a thermally transferable ink sheet having a plurality of colors, which are used for thermal printers, and a thermal printing apparatus suitable for using the ink sheets.

DESCRIPTION OF THE RELATED ART

Examples of conventional ink sheets for thermal printers are disclosed in U.S. Pat. No. 4,496,955 and U.S. Pat. No. 5,185,315. In addition, a thermal printer and color ink sheets for the printer have been disclosed in a prior Japanese Patent Application No. 05-300035 and corresponding U.S. Pat. No. 5,466,075 filed on Jul. 15, 1994, both assigned to the same assignee as the present application. The disclosure of the prior applications will be understood from the following description taken in conjunction with the accompanying drawings.

Referring now to FIG. 11, there is shown the principal assembly of a thermal printing apparatus for printing color images according to the prior application. FIG. 12 shows a pattern figure of an ink sheet for use with the apparatus. As shown in the figures, the thermal printing apparatus comprises a platen 1 and a thermal head 2, which has a plurality of thermal elements attached with a radiator plate 2*a* and is aligned in a linear arrangement. A printing paper 3 is supplied on the platen 1. An ink sheet 4 may be, for example, a thin PET film whose base film has been coated with transferable ink by a printing technique, and dyes, yellow (Y) 4*b*, magenta (M) 4*c*, cyan (C) 4*d*, and black (BK) 4*e*, have been coated thereon corresponding to the respective printing areas (FIG. 12). A combination of the three colors without black (BK) 4*e* may also be employed.

As shown in FIG. 12, at the borders between adjacent ink coated regions, index marks 4*g* are provided for indicating the borders of the ink colors and various kinds of information regarding the ink sheets. A combination of a plurality of shading parts and transparent parts comprise each index mark 4*g*, and the sensors 7 read the combination so as to identify the type of the ink sheet and the like. Shading parts of the index mark 4*g* are provided by a coating which is capable of cutting off infrared light.

The thermal print apparatus also comprises a supply roll for the ink sheet 5; a take-up roll for the ink sheet 6; sensors 7 which detect light transmitted or shaded by the index mark 4*g* on the ink sheet 4; a sensor block 8; and a control unit 9. Each of the sensors 7 is comprised of a pair containing a light intercepting element and a light emitting element which has an intrinsic emitting wave length. The sensor block 8 has a plurality of sensors 7 which are aligned in a line thereon.

Down stream from the printing step by the thermal head 2, the above mentioned sensor alignment is located and oriented parallel to the thermal elements of the thermal head 2 arranged in a line. An interval. L between the thermal head 2 and the detecting point of the sensor block 8 exists. A control unit 9 controls the rotation of the platen 1, the printing of the thermal head 2, and the drive motor (not shown in the figures) for the supply roll 5 and the take-up roll 6 for the ink sheet according to the identification signals from each sensor 7 of the sensor block 8. One of the sensors of the sensor block 8 is a red light sensor 7*a* having a light emitting element whose emitting wave length is 635 nm and whose sensitivity characteristic toward the light transmitted through the ink on the ink sheet 4 is shown in FIG. 3. The relationship between transmission and shading of the light through each of the ink colors and the sensor marks is shown in FIG. 4, which will be described later.

Returning now to the operation of the printing apparatus, at the time when power is applied to the printing apparatus, or at completion of the printing of one color or one picture frame, the ink sheet is wound for positioning the thermal head 2 to the leading edge of the next ink page (the page head) or that of the next ink color (the color head). By detecting the index mark 4*g* using the sensors 7, the ink sheet 4 is then located in a prescribed position relative to the thermal head 2. Further, the type and condition of the ink sheet, such as in the end of the ink sheet or on the midway of printing, can be detected by the sensors 7 from combinations of the sensor marks of the index mark 4*g*.

As shown in FIG. 12, the yellow 4*b* is the first colored region in the periodically repeating set and it, therefore, serves as the head color of one set of ink colors. Selection of the yellow 4*b* for start of printing is performed by utilizing the red light sensor 7*a* by detecting a combination of transmitting and shading of the red light through adjacent ink coated regions sandwiching the index mark 4*g* located at each border. That is, the sensor 7*a* detects the color preceding the yellow 4*b* (in this example black BK) and the yellow 4*b*, both of which sandwich the index mark 4*g*.

In order to detect the preceding and following colors for proper alignment, in the above mentioned apparatus the take-up role is wound to additionally advance the ink sheet beyond the index mark 4*g*, so as to allow the red light sensor 7*a* to read the next ink color. Thereafter, the take-up role is rewound to provide proper positioning of the ink sheet 4. To detect transmission and shading of the red light through the ink coated region of the ink sheet by the sensor 7*a* immediately before the detection by the sensors 7, the region has to be extended by the same length as L2 shown in FIG. 12, since if the detecting portion turns transparent by transferring the ink therefrom by the thermal head 2, it becomes impossible to detect the ink color.

There are many types of ink sheets according to the size of printable region (such as A4 and A3), number of printing colors (such as three colors, four colors, and monochrome), the ink type (such as fusion type and sublimation type), color matching and color development sensitivity of the ink, and the like. Up to the present, to allow the print apparatus to identify the type of the ink sheet automatically from the information detected by the sensors 7, the number of the detecting elements of the sensors 7 for the index mark 4*g* has been increased. Among the sensor marks of the index mark 4*g*, however, there are some combinations of sensor mark blocks, which should be used commonly irrespective of the ink sheet type, for example, those indicating the end of the ink sheet or indicating that the printing is on the midway. Thus, in the case of the index mark 4*g* of the prior application, the number of the elements of the sensors 7 should be increased according to the increase of the ink sheet types, resulting in a higher price of the sensors 7 or trouble with miniaturizing the print apparatus. Furthermore, in the case of using the sensors 7 whose bit number exceeds the input port number of the CPU of the print apparatus, it is impossible to input the bit information directly to the CPU. An additional circuit is therefore required to process the information, which makes the circuit configuration more complicated, resulting in a higher price of the print apparatus.

SUMMARY OF THE INVENTION

This invention solves the above-described problems by using a more efficient detection scheme. It is an object of the invention to obtain a thermally transferable ink sheet and a thermal printing apparatus suitable for the ink sheet, which ink sheet enables simplifying the ink sheet feeding by the printing apparatus, requires no increase in width of the ink coated regions of the ink sheet, and allows the sensors 7 to identify more ink sheet types with less elements.

It is another object of the invention to be simplify the ink sheet feed, without specific sensor marks for indicating the head color, by detecting two ink colors simultaneously while detecting the index mark.

It is a further object of the invention to provide a thermal printing apparatus which is capable of identifying information according to an increase in the number of the ink sheet types or of the control subjects without increasing the number of the sensors.

A thermally transferable ink sheet according to the invention comprises: a base film having successive ink coated regions coated or printed with monochrome or a plurality of color inks thereon as one set in a periodically repeating manner, each ink coated region having the same area of printing to be performed; and index mark regions, whose index mark comprises a combination of a plurality of sensor marks indicating information regarding said ink sheet, located at each border between adjacent ink coated regions; wherein each pair of adjacent ink coated regions juxtaposed across each border have extended portions extending toward each other into the index mark region in directions parallel to the direction of ink sheet feeding.

A thermal printing apparatus using a thermally transferable ink sheet, according to the invention comprises: infrared light sensors for detecting the sensor marks of the index mark; and at least one red light sensor for detecting the ink coated region which is the extended portions extending into the borders; wherein both of the infrared light sensors and the red light sensor are aligned orthogonally to the direction of ink sheet feeding.

Other objects and advantages of this invention will become apparent from the detailed description given hereinafter. It should be understood, however, that the detailed description and specific embodiment are provided by way of illustration only since various changes and modifications within the spirit and scope of the invention will become apparent to the those skilled in the art from this detailed description.

BRIEF DESCRIPTION OF THE DRAWINGS

In all figures, the same and the substantially same elements are the same reference numbers.

DESCRIPTION OF PREFERRED EMBODIMENTS

Embodiment 1

Figure 1:
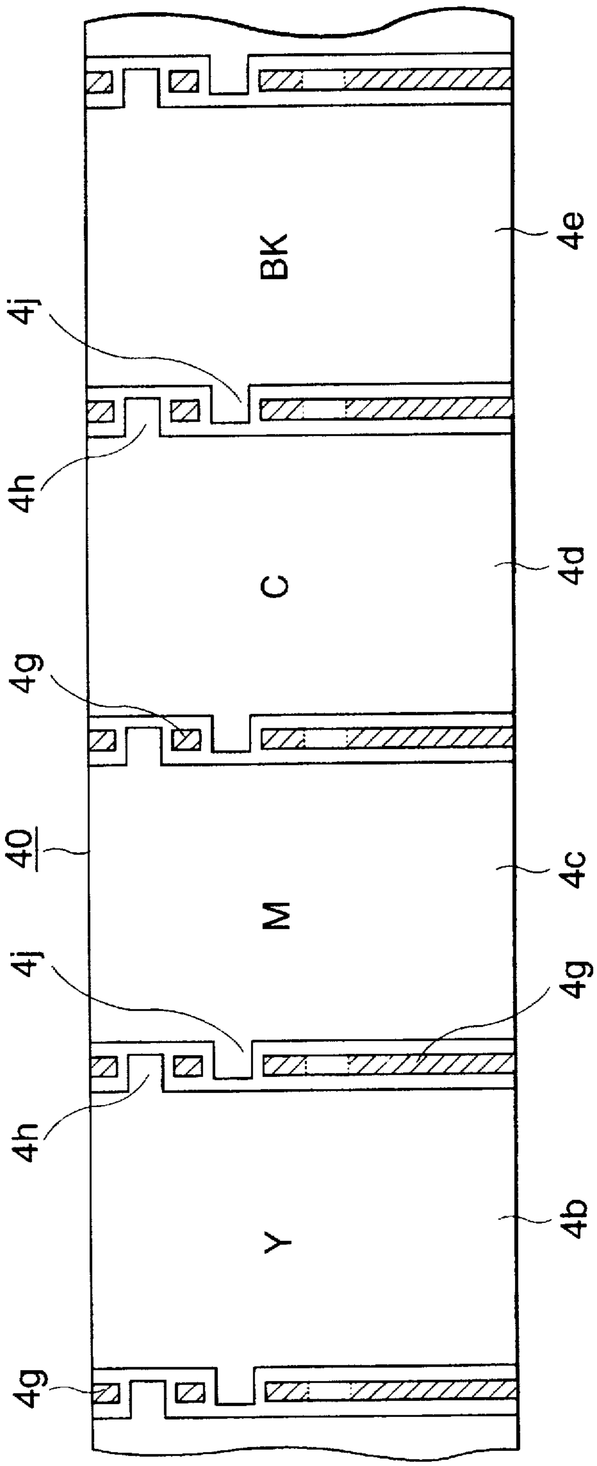
FIG. 1 is a plan view showing an ink sheet according to embodiment 1 of the invention.
Figure 2:
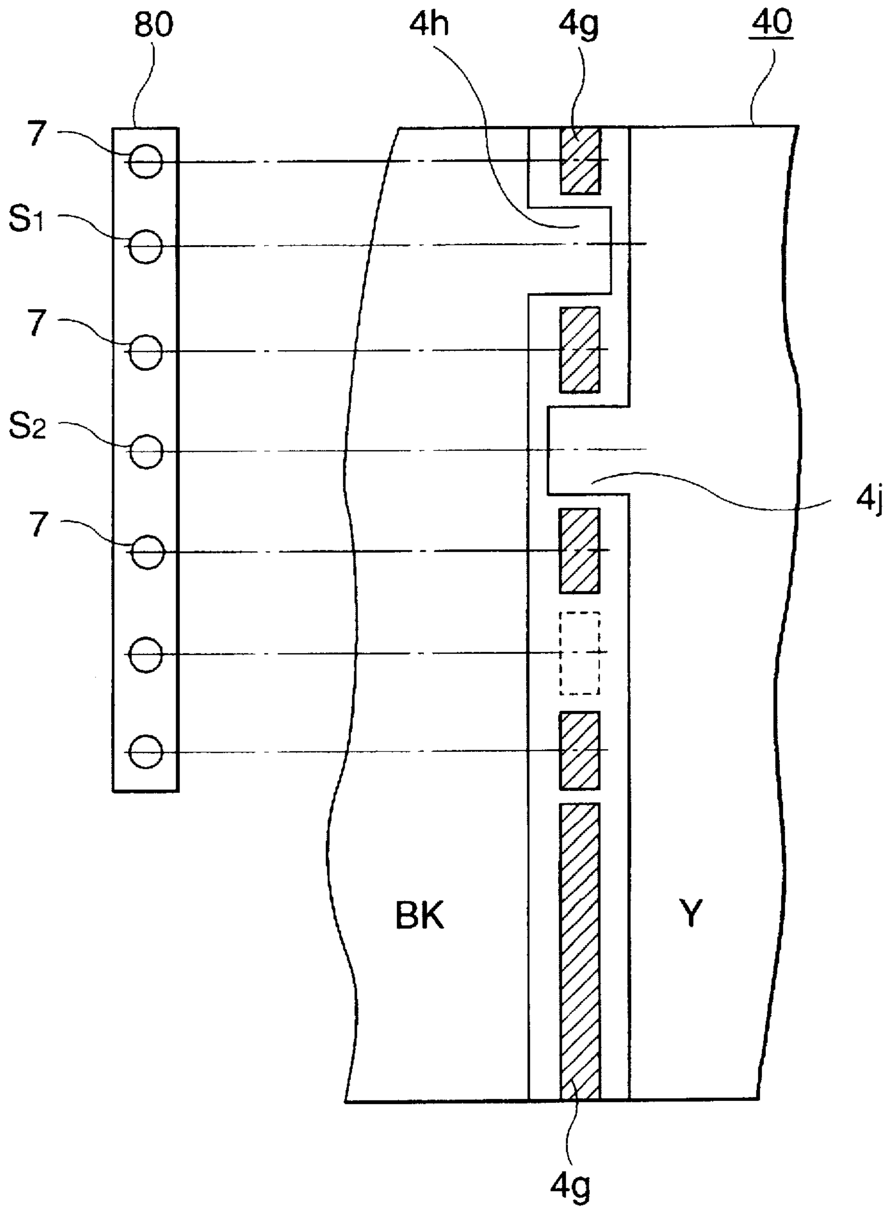
FIG. 2 is an enlarged view showing a sensor mark region of a ink sheet according to embodiment 1 of the invention.
Figure 11:
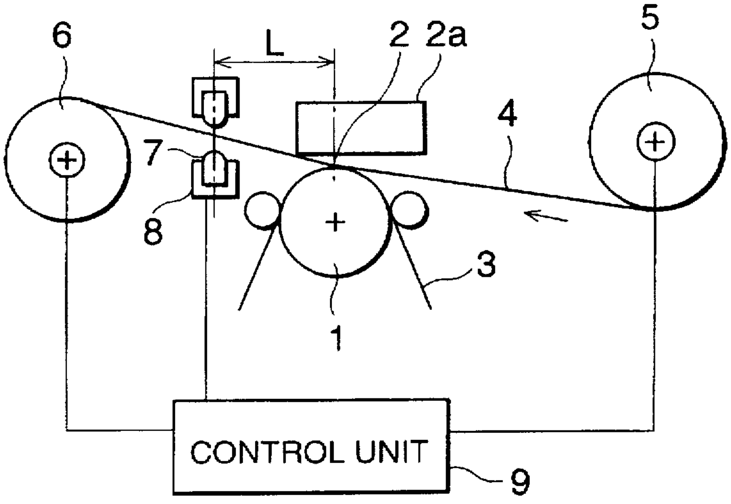
FIG. 11 is a plan view showing the principal assembly of a conventional apparatus for thermal color printing.
Figure 12:
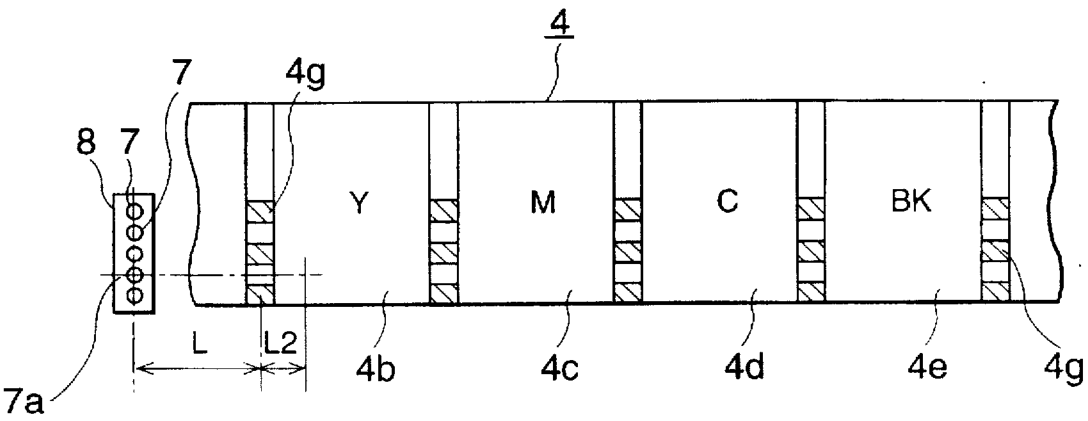
FIG. 12 is a plan view showing a pattern of a conventional ink sheet.

Referring now to FIG. 1, there is shown a top plan view of the principal part of an ink sheet 40 according to embodiment 1 of the invention. FIG. 2 shows an enlarged view of the sensor mark region of the thermally transferable ink sheet 40, and also shows a view describing the positional relationship between the sensor marks on the ink sheet and the sensors set up in a print apparatus according to a first embodiment of the present invention. In the figures, **4*b* to 4*g* and 7 represent the same elements as the above mentioned regarding FIG. 11 and FIG. 12. Each pair of adjacent ink coated regions, sandwiching the index mark 4*g* at each border, have portions extending toward each other into the region of the index mark 4*g* alternately in directions parallel to the direction of the ink sheet feeding so as to form a preceding color detecting portion 4*h* and a following color detecting portion 4*j*, respectively. At each border between adjacent ink coated regions, the preceding color detecting portion 4*h* and the detection portion of the following color 4*j* are arranged in the same line orthogonally to the direction of the ink sheet feeding. Therefore, red light sensors S1 and S2 of a sensor block 80 can detect and read the preceding color detecting portion 4*h* and the detection portion of the following color 4*j* at the same time that sensors 7 detect and read the index mark 4*g***. Since the sensor mark is comprised of ink which cuts off the infrared light of the infrared sensor, the sensor can detect the sensor mark.

Figure 3:
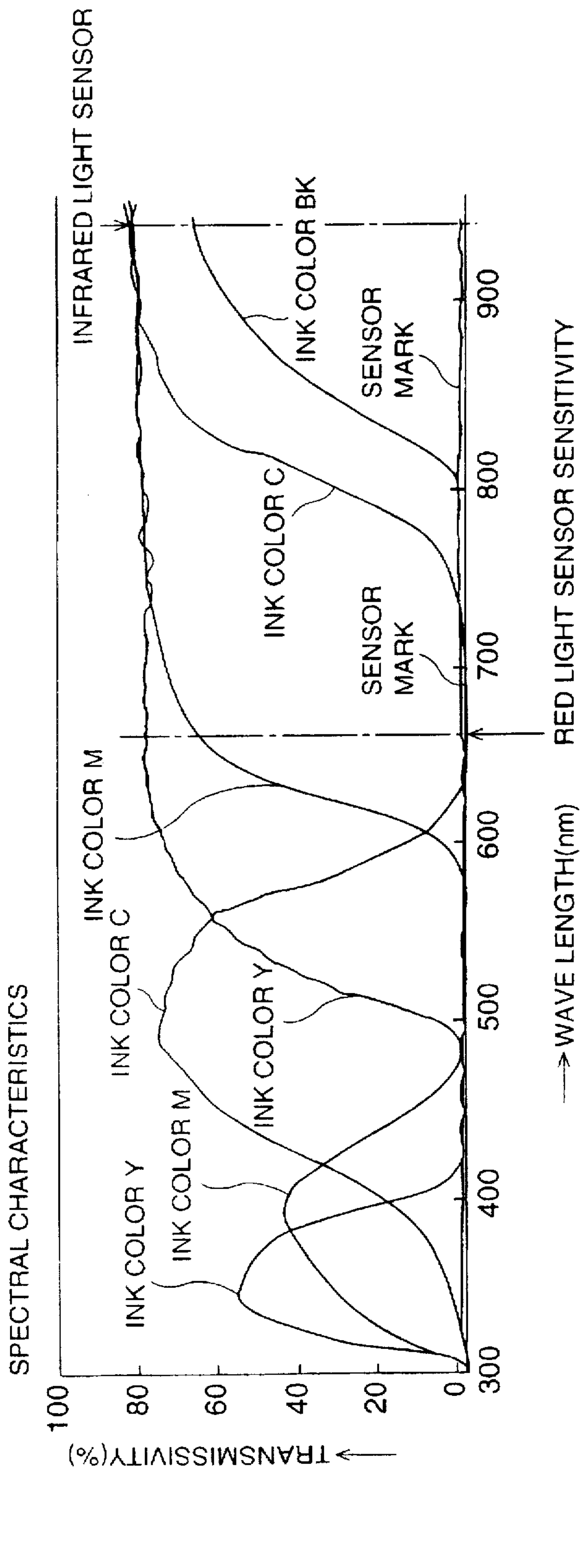
FIG. 3 is a figure showing the light transmission characteristic of ink colors.

The transmission characteristic of each ink color coated on the ink sheet is shown in FIG. 3, indicating that at the wavelength of the red light sensors S1 and S2 (635 nm), the transmissivities of yellow (Y) and magenta (M) are high, while those of cyan (C), black (BK), and the sensor marks are low. In the case of the infrared light sensors, the transmissivity of each ink color is high, while the infrared light is cut off by the sensor marks. The table of truth value shown in FIG. 4 is obtained from the difference in transmissivity of each ink color toward the light of a wave length of 635 nm emitted from the light emitting element of the red light sensors S1 and S2.

In other words, the light sensitivity level of the light from the light emitting elements of red light sensors and the infrared light sensors, which is transmitted through each ink color including the sensor marks, is determined at the light intercepting elements as transmission or shading according to a prescribed threshold value. As the result, for the red light sensors the truth values of yellow (Y) and magenta (M) are transmission, and those of cyan (C), black (BK) and the sensor marks are shading, while for the infrared light sensors those of the sensor marks are shading and those of other ink colors are transmission.

It should be noted that throughout the description of the preferred embodiment, reference is made to sensors S1 and S2 as being red light sensors. However, it will be apparent to those skilled in the art that any transmission sensitive sensor could serve the purpose of sensors S1 and S2. Thus, depending on the sensors chosen, various truth tables can be constructed and stored in the memory of the printing device. Thus, while the term red light sensor is used throughout the description of the preferred embodiment, it will be understood that the term is interchangeable with terms such as a transmission sensitive sensor.

Figures 4, 5:
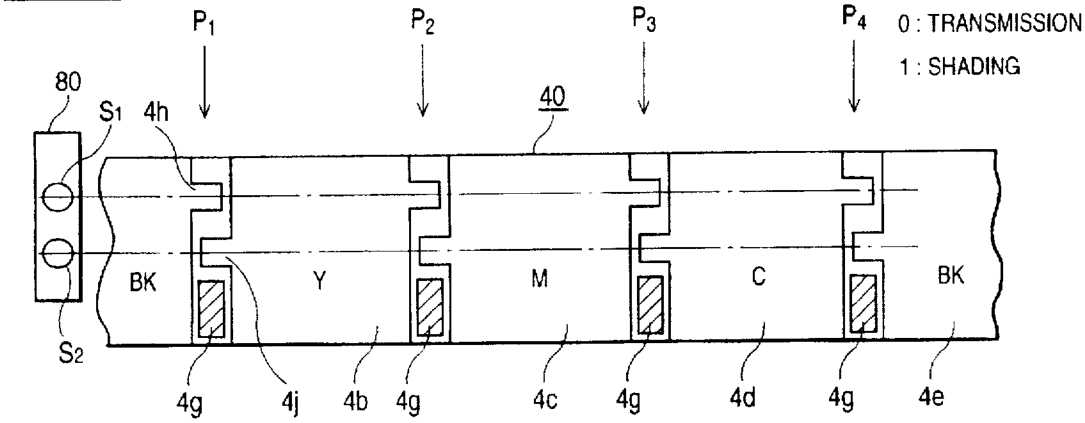
FIG. 4 is a table of truth value according to the difference of the transmissivity of each ink color detected by the red light sensor.
FIG. 5 shows the result obtained from each border of adjacent ink coated regions by the red light sensor.

FIG. 5(*a*) shows the result of the detection obtained by the red light sensors S1 and S2 at each border of the ink coated regions. FIG. 5(*b*) illustrates the positional relationship between the preceding color detecting portion **4*h* and the detection portion of the following color 4*j* at the borders of the ink coated regions (detecting positions) according to the feeding by means of the red light sensor marks S1 and S2 and the ink sheet 40** (having four colors in one set). FIG. 5(*a*) shows the table of truth value of transmission and shading of the ink colors at the preceding color detecting portion **4*h* and the detection portion of the following color 4*j* according to the detecting positions. The result from the readings of the index mark 4*g*** is not shown in FIG. 5(*b*), since this figure is provided only for illustrating the relationship between the borders of ink coated regions and the red light sensors S1 and S2.

As shown in FIG. 5 (a), the ink colors of the preceding color detecting portion **4*h* and the following color detecting portion 4*j***, both of which are extended toward each other at each border between adjacent ink coated regions, are detected by the red light sensors S1 and S2, and reveal that the combination of transmission and shading of the light obtained from each border of the ink sheet having four colors in a set is different from one another. Therefore, identifying the adjacent ink colors at each detection point can be realized by storing those combinations into the memory of the print apparatus.

FIG. 5(*b*) shows the positional relationship of each detecting position p1–p4 of the red light sensors S1 and S2 on the ink sheet 40 according to the above mentioned situation. As shown in the Figure, at the first detecting position P1, the red light sensor S1 detects the preceding color detecting portion **4*h* of black (BK) 4*e* and the red light sensor S2 detects the following color detecting portion 4*j* of yellow (Y) 4*b*. At the second detecting position P2, the red light sensor S1 detects the preceding color detecting portion 4*h* of yellow (Y) 4*b* and the red light sensor S2 detects the following color detecting portion 4*j* of magenta (M) 4*c*. In the same manner, the preceding color detecting portion 4*h* and the following color detecting portion 4*j*** detects the light shaded or transmitted by the ink colors at the third and fourth detecting positions, P3 and P4.

Returning now to the operation of the print apparatus, the head color setting for a set of ink colors of an ink sheet proceeds as follows. At first, electric power is applied to the print apparatus. After completion of the initial procedure, the ink sheet 4 is fed. The red light sensors S1 and S2 detect the transmission and shading of the light by the preceding color detecting portion **4*h* and the following color detecting portion 4*j* when the index mark 4*g* reaches the position corresponding to the sensors 7. According to this embodiment, the ink sheet 4** is fed until reaching a detection position where the red light sensor S1 detects shading and S2 detects transmission so as to finish the head color setting.

With regard to the ink sheet, having four colors in a set, used in this embodiment, it is identified that the leading edge of the head color yellow (Y) **4*b* reaches the position corresponding to the thermal head 2 when the red light sensor S1 detects shading and the red light sensor S2 detects transmission. In the case of an ink sheet having three colors in a set without black (BK), it is also possible to set the head color thereof by identifying the combination (the red light sensor S1 detects shading and the red sensor S2 detects transmission) similar to the ink sheet having four colors in a set, since the red sensor S1 detects cyan (C) and the red sensor S2 detects yellow (Y) when the leading edge of the head color reaches the position corresponding to the thermal head 2**.

By using the procedure for selection of the head color using the features of the present invention, it becomes unnecessary to feed the ink sheet back and forth at each border between adjacent ink coated regions in order to read the ink colors, as is done in systems of the prior art. Rather, in the system according to the present invention, the sensors 7 of the sensor block 80 can read the transmission and shading of the light using the red sensors S1 and S2 at the same time as detecting the index mark **4*g* by feeding the ink sheet 40** in only one direction.

According to embodiment 1 of the invention as mentioned above, this embodiment has the following features and advantages. The index mark is arranged at each border of adjacent ink coated regions, portions of each pair of the ink coated regions are extended toward each other into the index mark region, and the sensors corresponding to the sensor marks of the index mark are aligned orthogonally to the direction of the ink sheet feeding. Therefore, it is possible to read the ink colors and the index mark simultaneously at each border, resulting in simpler control of ink sheet feeding.

Embodiment 2

In the systems of the prior art as described above, because of the increase in the ink sheet types and the control objects, such as the information regarding hues and color development characteristic of the ink, the number of the sensor marks of index mark **4*g* on the ink sheet has to be correspondingly increased along the direction of the ink sheet's width, resulting in the shortage of space. Further, the number of the sensors 7 also has to be increased, providing a higher cost. According to embodiment 2 of the invention, the number of the sensors 7 shown in FIG. 12 does not have to be increased even if the identification items of the ink sheet increase. This embodiment will be described below with reference to FIG. 6**.

Figure 6:
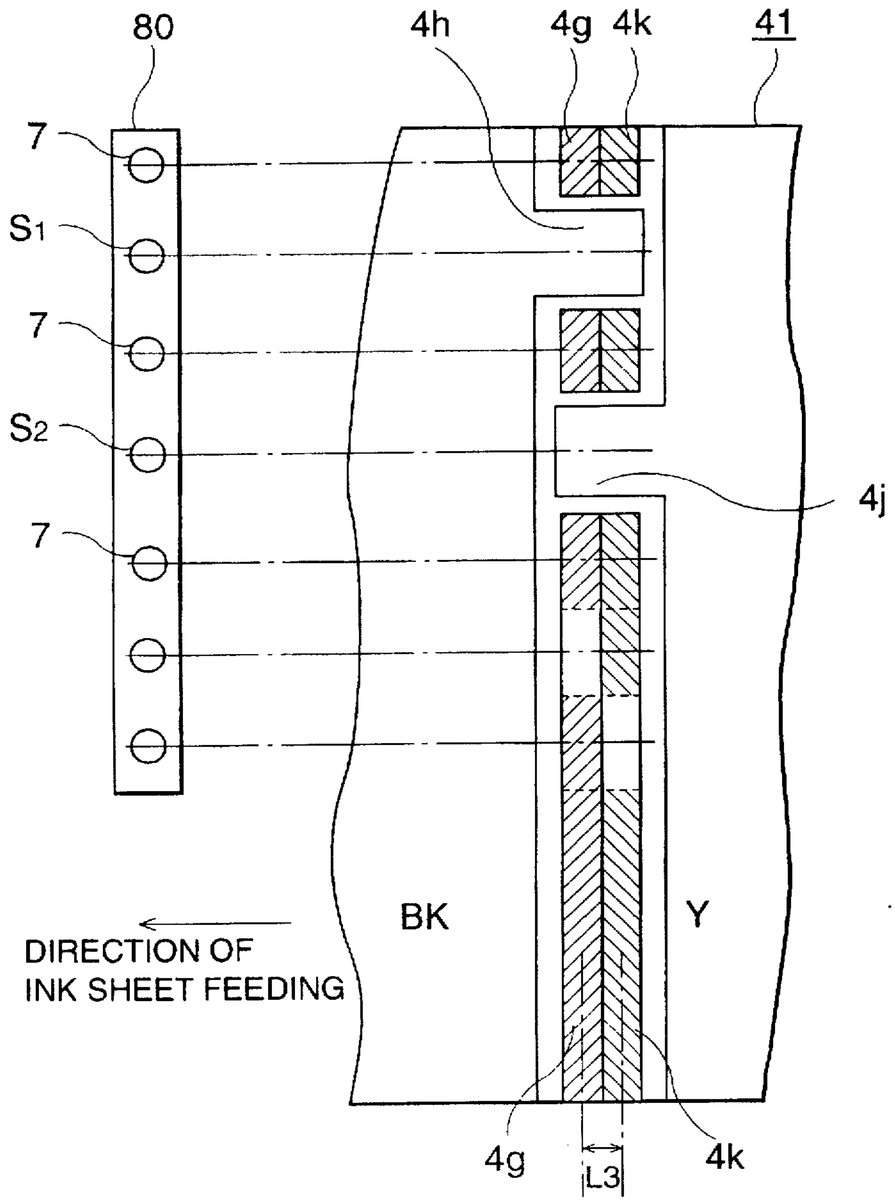
FIG. 6 is a plan view showing the principal assembly of an ink sheet according to embodiment 2 of the invention.

Referring now to FIG. 6, there is shown a plan view illustrating the principal assembly of an ink sheet 41 of the embodiment 2 of the invention. In this figure, 7, 80, S1, S2, **4*h*, and 4*j* represent the same elements as described in embodiment 1 mentioned above. A second index mark 4*k* is positioned in parallel to the index mark 4*g*, and is arranged as a set with the index mark 4*g*** at each border between adjacent ink coated regions.

According to the ink sheet 41 in embodiment 2, it is possible to detect as many identifications as the number to the second power of the number of the sensors 7 by utilizing the combination of the presence and the absence of the sensor marks arranged at the segmental regions of the index mark **4*g* and 4*k* corresponding to the sensors 7. To realize that, after reading the information from index mark 4*g*, the ink sheet 41 is additionally fed for a distance of L3 to the detecting position of the second index mark 4*k*. The data read can be stored in a memory system. The information which is read from the second index mark 4*k* is then combined with the information obtained in advance from the index mark 4*g* so as to control the print apparatus. Other operations concerning embodiment 2 are not described here since they are similar to those described in embodiment 1. Additionally, in this particular embodiment the preceding color detecting portion 4h and the following color detecting portion 4j are made to extend the combined width of index marks 4g and 4k**.

Embodiment 3

Figure 7:
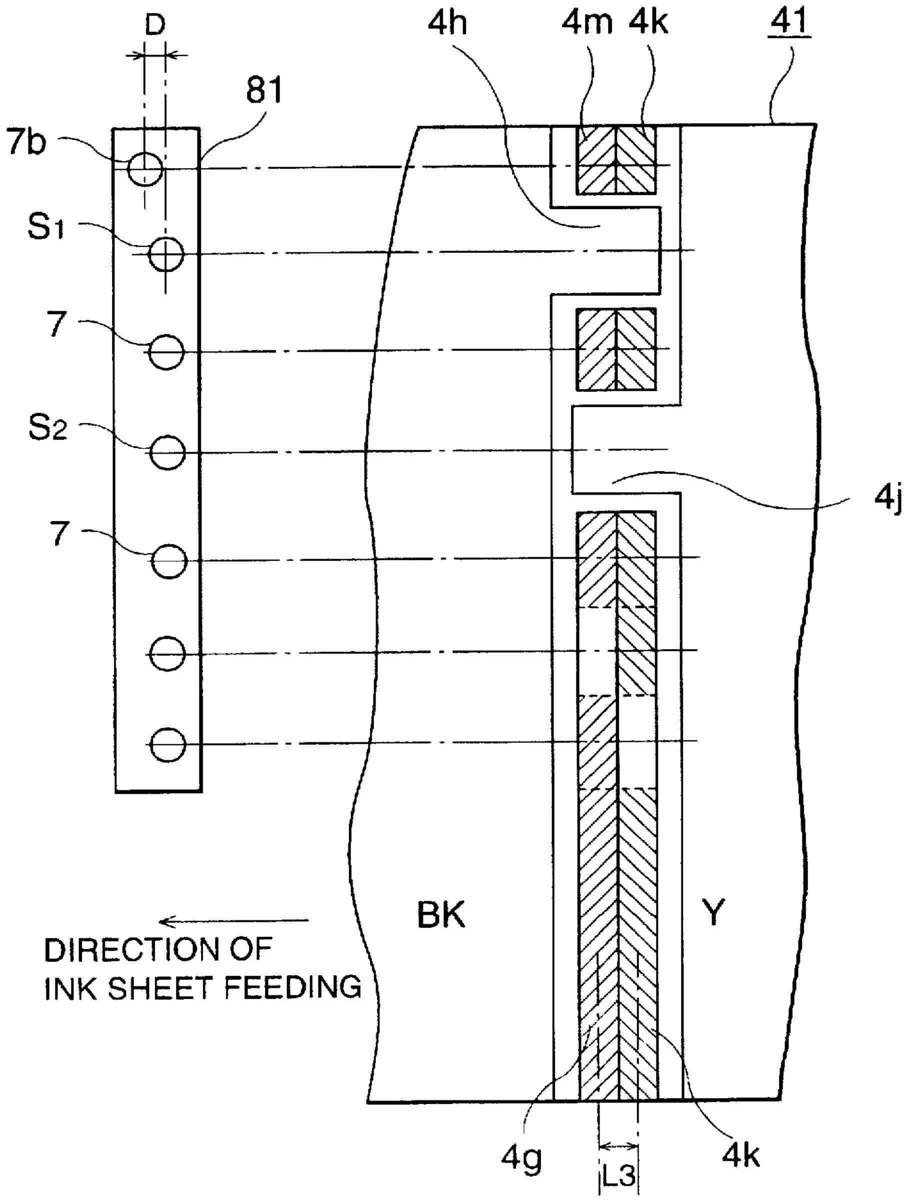
FIG. 7 is a plan view showing the principal assembly of an ink sheet according to embodiment 3 of the invention. The relationship between the ink sheet and the sensors is also shown.

Embodiment 3 according to the invention avoids the reading errors of the index mark to ensure reading accuracy. Referring now to FIG. 7, there is shown a plan view illustrating the principal assembly of the ink sheet 41 according to embodiment 3. The relationship between the sensors and the ink sheet 41 is also shown. In the figure, 41, 7, S1, S2, 4g, 4h, and 4j represent the same elements as described in embodiment 2 mentioned above. A sensor block 81 has a feed detecting sensor for the ink sheet 7b, which sensor is positioned at a distance D in a direction parallel to the direction of the ink sheet feeding from the alignment line of other sensors, 7, S1, and S2. Therefore, when the feed detecting sensor 7b detects a corresponding sensor mark among the sensor marks of the index mark 4g in the course of feeding of the ink sheet, the rest of the sensor marks of the index mark 4g inevitably reach the detecting position of other sensors, 7, S1, and S2, preventing reading errors of the index mark 4g. This system is especially useful in the case in which the extension or shrinkage of the ink sheet by the heat of the thermal head 2 impairs the parallel relationship between the reading line of the index mark 4g and the alignment line of the sensors 7.

Among the sensors 7, a sensor 7b is specified for the feed control so as to read a feed detecting mark 4m which is arranged at the border between adjacent ink coated regions in the course of ink sheet feeding, the sensor 7b detects the shading of the light and stops the feeding. At this stop position, the type of ink sheet, the identification of the ink color of adjacent ink coated regions juxtaposed across each border, and the like are determined using the readings obtained from other sensors.

As shown in FIG. 7, the distance D is, preferably, approximately one half of the width of the index mark 4g in a direction parallel to the direction of the ink sheet feeding so as to ensure reading accuracy. It will be appreciated that the sensor 7b can be designed to read data from mark 4m or, alternatively, to detect the change in transmissivity caused by the leading edge of mark 4m. Other implementations will be apparent to those skilled in the art.

Embodiment 4

In an embodiment 4 of the invention, the extended portions of adjacent ink coated regions are registered with each other along a line parallel to the direction of the ink sheet feeding at each border. Therefore, it is possible to identify the head ink color by only one red light sensor which can read the transmission and shading of the light through the extended portions.

Figure 8:
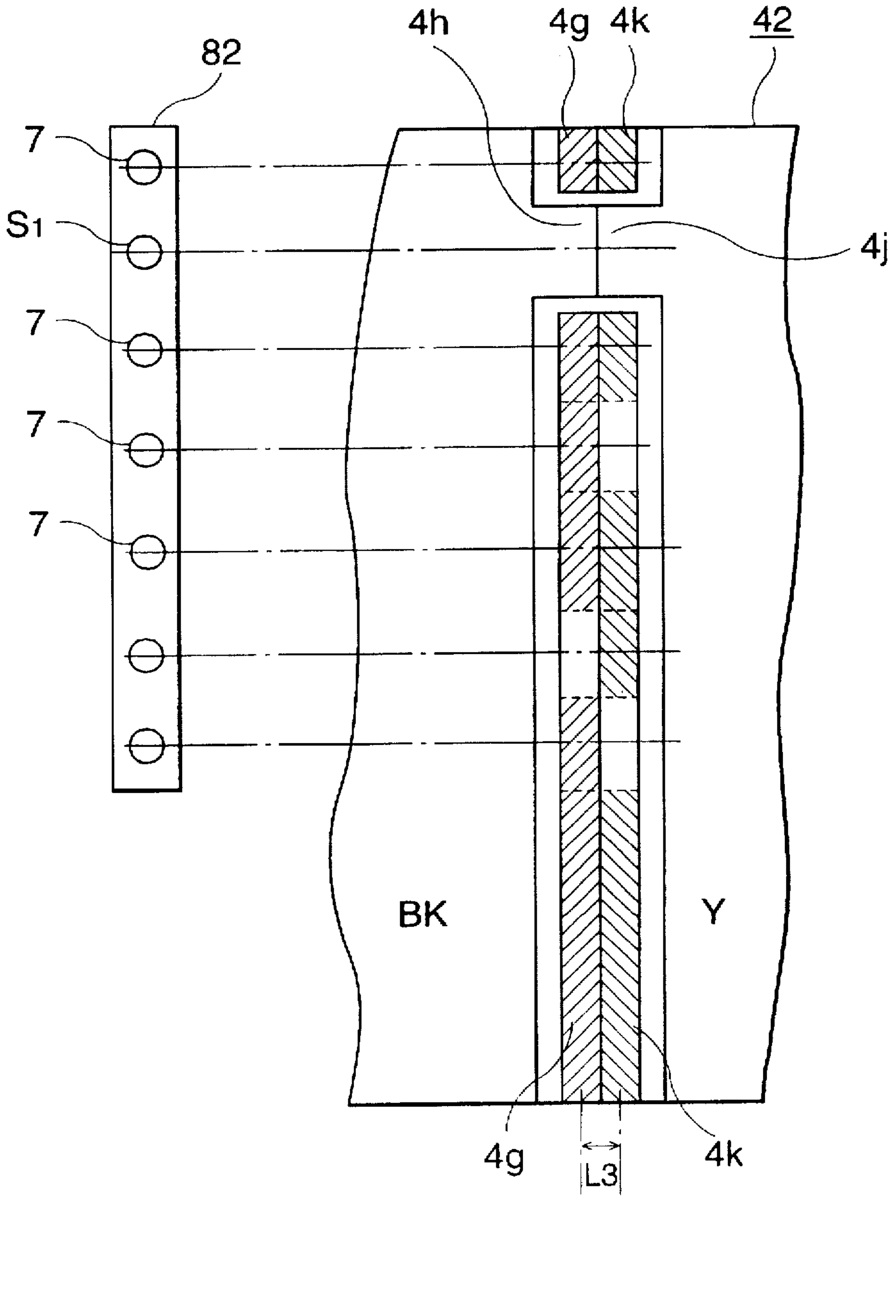
FIG. 8 is a plan view showing the principal assembly of an ink sheet according to embodiment 4 of the invention.

Referring now to FIG. 8, there is shown a plan view illustrating the principal assembly of an ink sheet 42 according to embodiment 4. In the figure, a sensor block 82 is shown, and 7, S1, 4g, 4h, and 4j represent the same elements as described in embodiment 2 mentioned above. The ink sheet 42 according to embodiment 4 is provided with the preceding color detecting portion 4h and the following color detecting portion 4j, which are registered with each other along a line parallel to the direction of the ink sheet feeding at a position corresponding to the reading of the index mark 4g and the second index mark 4k. The color of each adjacent ink coated region is identified by detecting the combination of the transmission and shading of the light in accordance with the reading sequence of the red light sensor S1 in the course of feeding of the additional distance L3, in the same manner as the reading of the index mark 4g and the second index mark 4k.

The identification step proceeds as follows. Among the sensor marks of the index mark 4g, a specific sensor mark is identified as a feed detecting mark. When one of the sensors 7 corresponding to the feed detecting mark detects shading of the light in the course of feeding the ink sheet 40, the feeding is stopped to collect the readings obtained from other sensors. After that, the ink sheet is fed additionally for the distance of L3 and is stopped to collect the reading obtained from each sensor. Combinations of the shading and transmission of the light detected by each sensor before and after the additional feeding are collected to identify each ink color of adjacent ink coated regions at each border and to classify the ink sheet attributes. Thus, it is possible to obtain more identification information with less sensors 7 in the absolute number, resulting in a decreased number of the input ports for the CPU and a simpler circuit assembly.

According to embodiment 4, a similar effect to embodiment 2 is provided by only one red light sensor. It is also possible to increase ink sheet information indicated by the index mark, since the segmental region of the index mark 4g and the second index mark 4k can be increased.

Embodiment 5

In an embodiment 5 of the invention, the detecting edge of the detecting sensor mark for ink sheet feeding is positioned apart from other sensor marks of the index mark so as to be detected later than other sensor marks. Thus, when the feed detecting sensor detects its corresponding sensor mark, the rest of the sensor marks of the index mark inevitably reach the detecting position of the corresponding sensors, ensuring reading accuracy. This can help increasing the reading accuracy in a similar manner to having the sensor 7b offset as described with reference to FIG. 7, but using printing devices which have all the sensors 7 aligned.

Figure 9:
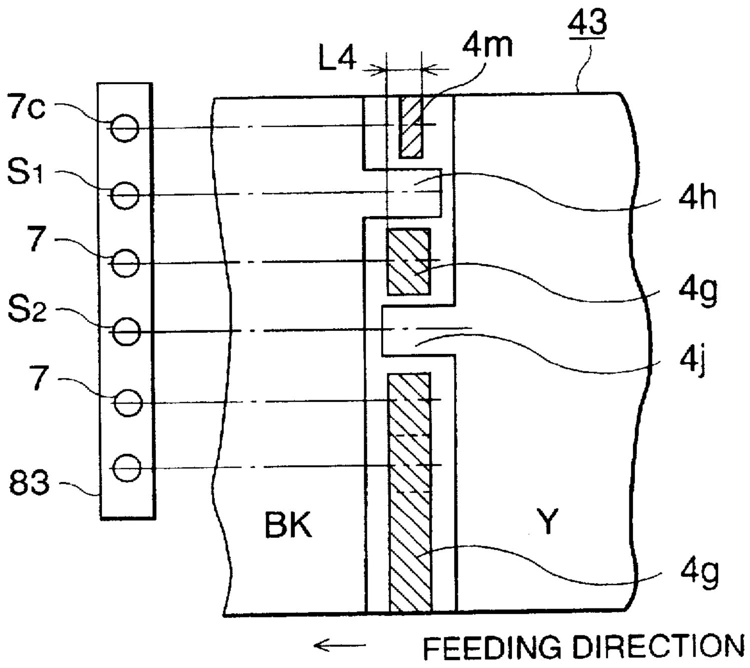
FIG. 9 is a plan view showing the principal assembly of an ink sheet according to embodiment 5 of the invention.

Referring now to FIG. 9, there is shown a plan view illustrating the principal assembly of an ink sheet 43 according to embodiment 5. In the FIG., 7, S1, 4g, 4h, and 4j represent the same elements as described in embodiment 2 mentioned above. Sensor block 83 is provided with a feed detecting sensor 7c, one of the sensors 7, specified for detecting the feeding of the ink sheet 43. A feed detecting mark 4m is arranged at the position corresponding to the feed detecting sensor 7c. The leading edge of the feed detecting mark 4m is positioned at a distance of L4 apart from the leading edges of the other sensor marks of the index mark 4g in a direction parallel to the direction of the ink sheet feeding.

By positioning the leading edge of the feed detecting mark 4m at a distance of L4 from leading edges of the other sensor marks of index mark 4g, it is possible to avoid reading errors of the index mark 4g, since other sensor marks of the index mark 4g inevitably reach the position to be identified by the sensors 7 when the feed detecting mark 4m is detected by the feed detecting sensor 7c in the course of ink sheet feeding. This system is especially useful in the case in which the extension or shrinkage of the ink sheet by the heat of the thermal head 2 impairs the parallel relationship between the reading line of the index mark 4g and the alignment line of the sensors 7.

Embodiment 6

In an embodiment 6 of the invention, the trailing edge of the detecting sensor mark for ink sheet feeding is offset within the borders of the index mark of an even numbered lines (counted along the direction of the ink sheet feeding). According to the feature of this embodiment, the order to read the first set of sensor marks is determined by detecting the first transition of the sensor's reading, and the order to read the second set of sensor marks is determined by the last transition, resulting in simpler control of the ink sheet feeding. If only two sets of sensor marks are provided, the reading can be determined solely by detecting the transitions. If more than two sets are provided, the first reading can be determined by the first transition and thereafter each subsequent reading is performed after the sheet has been advance a predetermined amount. Completion of reading is determined when the second transition is detected.

Figure 10:
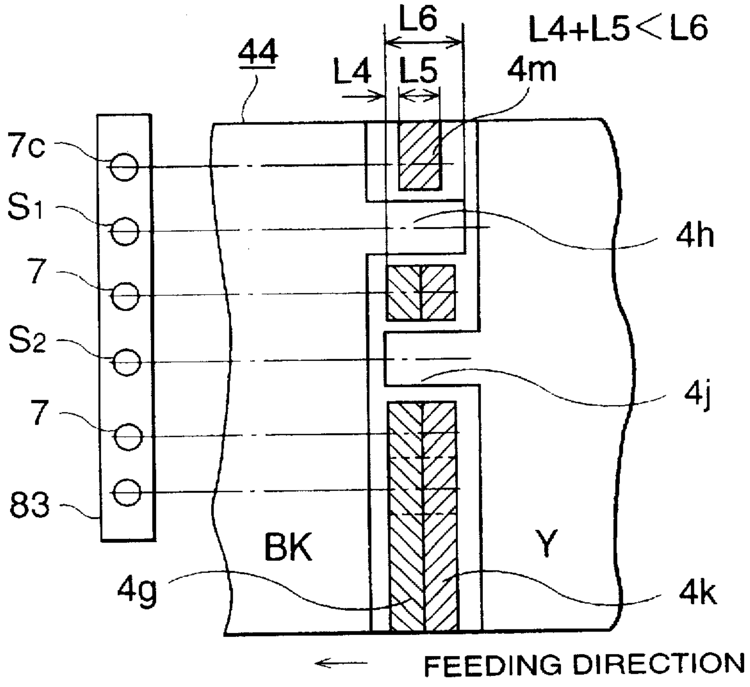
FIG. 10 is a plan view showing the principal assembly of an ink sheet according to embodiment 6 of the invention.

Referring now to FIG. 10, there is shown a plan view illustrating the principal assembly of an ink sheet 44 according to embodiment 6. In the FIG., 7, 7*c*, 83, S1, 4*g*, 4*h*, 4*j*, 4*k*, and 4*m* represent the same elements as described in embodiment 4 and 5 mentioned above. According to embodiment 6, the sensors 7 are aligned with sensor 7*c*. Thus, when sensor 7*c* detects the leading edge of mark 4*m*, i.e. detects a transition from transparent to opaque, the sensors 7 will be positioned at the center of the marks 4*g* to provide accurate reading thereof. Conversely, when the feed detecting sensor 7*c* detects the trailing edge of mark 4*m*, i.e., detects the transmission of the light, the sensors 7 are positioned at the center of marks 4*k* to provide accurate reading thereof.

As shown in FIG. 10, the feed detecting mark 4*m* has a width of the shading area L5, which is positioned at a distance of L4 apart from other sensor marks of the index mark 4*g*. In other words, their relationship is as follows: L4+L5<L6, and L4+L5>the width of the index mark 4*g*; wherein L6 is the total detecting width of the index mark 4*g* and the second index mark 4*k*. Therefore, the sensor marks of index mark 4*g* are read by detecting the transition at the feed detecting mark 4*m*, and the second index mark 4*k* is read by detecting the first transition at the rear edge of the feed detecting mark 4*m*.

According to the above mentioned assembly, the control of the additional feeding L3 by the print apparatus described in embodiment 2 is not required to read the second index mark 4*k*, resulting in a simpler feed control. Moreover, even if the value of the detecting width L6, which represents the total width of the index mark 4*g* and the second index mark 4*k*, is varied depending on the type or size of an ink sheet, it is possible to read the index mark 4*g* and the second index mark 4*k* with good accuracy by detecting the last transition and the first transition caused by the detection by the feed detecting sensor 7*c*.

While the invention has been described with respect to certain preferred embodiments, various modifications and additions within the spirit of the invention will occur to those of skill in the art, which modifications and additions would be within the scope of the following claims.

What is claimed is:

1. A thermally transferable ink sheet comprising:

a base film having periodically repeated sets of successive ink coated regions of various color inks;

index mark regions, each of said index mark regions interposed between a respective pair of first and second adjacent ink coated regions, each of said index mark regions comprising a plurality of sensor marks;

wherein each of said pairs of first and second adjacent ink coated regions is juxtaposed across a respective index mark region, and said first ink coated region has an extended portion extending toward said second ink coated region into said respective index mark region in a direction parallel to the direction of ink sheet feeding, and said second ink coated region has an extended portion extending toward said first ink coated region into said respective index mark region in a direction parallel to the direction of ink sheet feeding.

2. A thermally transferable ink sheet as set forth in claim 1, wherein each of said index mark regions comprises at least two rows of sensor marks disposed next to each other and aligned orthogonally to the direction of ink sheet feeding.

3. A thermally transferable ink sheet as set forth in claim 2, wherein said extended portions of each pair of adjacent ink coated regions are registered with each other along a line parallel to the direction of ink sheet feeding so as to meet each other at a boundary between said rows of sensor marks.

4. The thermally transferable ink sheet as set forth in claim 1, wherein each of said index mark regions further comprises a feed alignment sensor mark, wherein the width of said sensor marks is constant and each of said sensor marks is consistently aligned orthogonally to the direction of ink sheet feeding.

5. A thermally transferable ink sheet as set forth in claim 4, wherein a trailing edge of said feed alignment sensor mark is offset so as to terminate before alignment of trailing edges of said sensor marks, to thereby depart a detecting position of a corresponding sensor before said sensor marks depart detecting positions of corresponding sensors.

6. The thermally transferable ink sheet as set forth in claim 4, wherein a leading edge of said feed alignment sensor mark is offset so as to be retarded from alignment of said sensor marks, to thereby reach a detecting position of a corresponding sensor after said sensor marks reach detecting positions of corresponding sensors.

7. The thermally transferable ink sheet as set forth in claim 1, wherein each of said index mark regions further comprises a feed alignment sensor mark, and wherein a corresponding portion of a respective index mark region containing said feed alignment sensor mark comprises one sensor mark, and wherein other portions of said respective index mark region comprise at least two rows of sensor marks disposed next to each other and aligned orthogonally to the direction of ink sheet feeding.

8. A thermally transferable ink sheet comprising:

a base film having periodically repeated sets of successive ink coated regions of various color inks;

index mark regions, each of said index mark regions interposed between a respective pair of first and second adjacent ink coated regions, each of said index mark regions comprising a plurality of sensor marks;

wherein each of said pairs of first and second adjacent ink coated regions is juxtaposed across a respective index mark region, and at least one of said first and second adjacent ink coated regions has an extended portion extending toward a corresponding ink coated region of said respective pair of adjacent ink coated regions into said respective index mark region in a direction parallel to the direction of ink sheet feeding.

9. A thermally transferable ink sheet as set forth in claim 8, wherein each of said index mark regions comprises at least two rows of sensor marks disposed next to each other and aligned orthogonally to the direction of ink sheet feeding.

10. The thermally transferable ink sheet as set forth in claim 8, wherein each of said index mark regions further comprises a feed alignment sensor mark, and wherein the width of said sensor marks is constant and each of said sensor marks is consistently aligned orthogonally to the direction of ink sheet feeding.

11. A thermally transferable ink sheet as set forth in claim 10, wherein a trailing edge of said feed alignment sensor mark is offset so as to terminate before alignment of trailing edges of said sensor marks, to thereby depart a detecting position of a corresponding sensor before said sensor marks depart detecting positions of corresponding sensors.

12. The thermally transferable ink sheet as set forth in claim 10, wherein a leading edge of said feed alignment sensor mark is offset so as to be retarded from alignment of said sensor marks, to thereby reach a detecting position of a corresponding sensor after said sensor marks reach detecting positions of corresponding sensors.

13. The thermally transferable ink sheet as set forth in claim 8, wherein each of said index mark regions further comprises a feed alignment sensor mark, and wherein a corresponding portion of a respective index mark region containing said feed alignment sensor mark comprises one sensor mark, wherein other portions of said respective index mark region comprise at least two rows of sensor marks disposed next to each other and aligned orthogonally to the direction of ink sheet feeding.

* * * * *